United States Patent
Korhonen

(10) Patent No.: US 7,036,129 B1
(45) Date of Patent: Apr. 25, 2006

(54) DIAGNOSTIC SYSTEM INTEGRATED WITH DEVICE DRIVERS OF AN OPERATING SYSTEM

(75) Inventor: Aki Korhonen, Davis, CA (US)

(73) Assignee: PC-Doctor, Inc., Reno, NV (US)

( * ) Notice: Subject to any disclaimer, the term of this patent is extended or adjusted under 35 U.S.C. 154(b) by 787 days.

(21) Appl. No.: 09/800,086

(22) Filed: Mar. 5, 2001

Related U.S. Application Data

(60) Provisional application No. 60/186,965, filed on Mar. 6, 2000.

(51) Int. Cl.
*G06F 3/00* (2006.01)

(52) U.S. Cl. .............. 719/321; 719/327; 719/328; 719/310

(58) Field of Classification Search ............. 719/321, 719/327, 328, 310; 714/38, 25
See application file for complete search history.

(56) References Cited

U.S. PATENT DOCUMENTS

| | | | | |
|---|---|---|---|---|
| 4,802,164 A * | 1/1989 | Fukuoka et al. | ............. | 714/44 |
| 4,888,771 A * | 12/1989 | Benignus et al. | ............. | 714/26 |
| 5,802,365 A * | 9/1998 | Kathail et al. | ............. | 719/321 |
| 5,887,169 A * | 3/1999 | Lacombe | ............. | 719/311 |
| 5,896,494 A * | 4/1999 | Perugini et al. | ............. | 714/27 |
| 6,044,408 A * | 3/2000 | Engstrom et al. | ............. | 719/328 |
| 6,240,468 B1 * | 5/2001 | Capelli | ............. | 710/14 |
| 6,253,255 B1 * | 6/2001 | Hyder et al. | ............. | 719/321 |
| 6,269,409 B1 * | 7/2001 | Solomon | ............. | 719/329 |
| 6,449,735 B1 * | 9/2002 | Edwards et al. | ............. | 714/25 |
| 6,742,148 B1 * | 5/2004 | Korhonen | ............. | 714/718 |

OTHER PUBLICATIONS

"Diagnostic kernel Extension", IBM Technical Disclosure Bulletin, Oct. 1992, pp. 137-138.*

* cited by examiner

*Primary Examiner*—William Thomson
*Assistant Examiner*—Thanh Ha
(74) *Attorney, Agent, or Firm*—Fliesler Meyer, LLP

(57) ABSTRACT

A hardware access layer interface for performing diagnostics in a computer system having an operating system and at least one hardware device. The interface is a registering and synchronizing agent in the given operating system. The interface has a device driver for managing the hardware device, a kernel module for communicating with the device driver and the operating system, and a diagnostic module for coordinating with the kernel module and/or the device driver in order to perform diagnostics on the hardware device. The interface enables the device driver to publish its capabilities to interested diagnostic modules or the module responsible for managing the device.

28 Claims, 5 Drawing Sheets

DIAGNOSTIC SYSTEM INTEGRATED WITH DEVICE DRIVERS OF AN OPERATING SYSTEM

CROSS-REFERENCE TO RELATED APPLICATIONS

This application claims priority from U.S. Provisional Patent Application No. 60/186,965, filed Mar. 6, 2000, entitled INTEGRATING DIAGNOSTICS WITH THE DEVICE DRIVERS OF AN OPERATING SYSTEM which is hereby incorporated by reference, as if set forth in full in this document, for all purposes.

BACKGROUND OF THE INVENTION

The present invention relates generally to the field of testing computer systems, and more specifically to a system for performing diagnostic tests on computer components in a computer system while an operating system is active.

Conventional schemes for performing diagnostic tests on components of a computer system, including the CPU, memory, storage, computer peripheral (input/output (I/O)) devices such as printers, displays, networking cards, keyboards and the like are well known. The importance of testing such devices cannot be overemphasized. Costs associated with defects in computer components and devices are relatively high due to user downtime and potential loss of data. Even where there is no downtime, the output of a defective device may be erroneous. Therefore, it is important to ensure that defective devices are quickly detected and removed to avoid the aforementioned disadvantages.

Many operating systems work with device drivers through which the operating system interfaces with the various devices in the computer. Device drivers are typically routines or programs which coordinate the flow of data to and from the devices. Operating systems such as DOS™ Windows™, etc. are pre-bundled with device drivers specific to devices which may be subsequently attached to the computer. If the computer system is to communicate with a new device, a device driver specific to that new device must be installed (if it is unavailable within the computer system). The device driver is typically supplied by the manufacturer of the device for installation on the computer system and can be loaded when the computer is booted up.

Device drivers often provide a degree of independence that simplifies the interaction of an application program with the particular device. In some instances, however, such independence is disadvantageous because access to an device can be obtained only through the associated device driver. That is, diagnostic tests on the device must be performed through the specific device driver.

Disadvantageously, while certain device drivers are capable of performing diagnostic tests, such tests are limited and more often are organized in a manner that makes the cross-comparison of diagnostic test results from one device driver to another impossible. Similarly, device drivers assigned by modern operating systems provide only limited methods for diagnostic tests to bypass or work with the device driver in order to test the device. Furthermore, diagnostic methods currently in device drivers are not in a standardized format which would allow their use by third party applications, because there is no standard for device driver diagnostics, and device drivers are written by different companies all of whom create their device drivers independently.

Therefore, it would be desirable to provide a system which is capable of handling the aforementioned problems relating to the conventional approaches for performing diagnostic tests on devices which are attached to computer systems.

SUMMARY OF THE INVENTION

A first embodiment of the present invention discloses a diagnostic system for testing computer components (devices) coupled to a computer system. The diagnostic system serves as an agent working with the device drivers of the operating system to test the devices. As noted, since device drivers usually manage access to an device, the diagnostic system facilitates communication between the device driver and a diagnostic module to test the device.

In an alternate embodiment, the diagnostic system is a method for testing a device in a computer system having an operating system. The method includes the steps of determining a device driver for the device; determining a class to which the device driver belongs; and performing a diagnostic test based on the class of the device driver. The device driver may belong to a class of drivers capable of accessing the device in parallel with a diagnostic module after allocating an area of the device for testing. Further, the method is performed while the operating system is active.

In a further embodiment, the diagnostic system is a method for performing diagnostics on a computer hardware device. The steps for the method include publishing capabilities of the device driver; receiving the capabilities of the device driver; and performing a diagnostic test on the hardware device, based on the capabilities of the device driver.

According to a further aspect of the present invention, in a computer system having an operating system and at least one hardware device, a diagnostic hardware access layer interface ("DHALI") for performing diagnostics is disclosed. The interface comprises a device driver for managing the hardware device; a kernel module for communicating with the device driver and the operating system; and a diagnostic module for coordinating with the kernel module and/or the device driver in order to perform diagnostics on the hardware device. The device driver, the kernel module and the diagnostic module may comprise hardware, software instructions or a combination of both.

According to another aspect of the present invention, the step of receiving the capability of the device driver noted above further comprises identifying the capability of the device driver by use of a diagnostic module.

According to another aspect of the present invention, the step of publishing the capability of a device driver further comprises broadcasting that the device driver is capable of accessing the computer hardware device in parallel with a diagnostic module after allocating an area of the computer hardware device for testing.

According to another aspect of the present invention, the step of publishing the capability of a device driver further comprises broadcasting that the device driver is capable of accessing the computer hardware device in parallel with a diagnostic module if the device driver is notified by the diagnostic module when testing is completed.

According to another aspect of the present invention, the step of publishing the capability of a device driver further comprises broadcasting that the device driver is capable of accessing the computer hardware device in parallel with a diagnostic module if the device driver is off-line.

According to another aspect of the present invention, the step of publishing the capability of a device driver further comprises broadcasting that the device driver is capable of being passed through to access the computer hardware device.

According to another aspect of the present invention, the step of publishing the capability of a device driver further comprises broadcasting that the device driver is capable of being passed through in diagnostic mode in order to access the computer hardware device.

According to another aspect of the present invention, the step of publishing the capability of a device driver further comprises broadcasting that the device driver is capable of performing diagnostics on the hardware component only by diagnostics embedded in the device driver.

According to another aspect of the present invention, the step of publishing the capability of a device driver further comprises broadcasting the capability of the device driver, the capability being dependent on the feature of the hardware component and the mode of the device driver.

According to another aspect of the present invention, the step of performing a diagnostic test comprises performing the diagnostic test directly on the device.

According to another aspect of the present invention, the step of performing a diagnostic test comprises allocating an area of the device for testing the device.

According to another aspect of the present invention, the step of performing a diagnostic test is done directly on the allocated area, and further comprises the step of releasing the allocated area when the test is concluded.

Other aspects of the present invention will become apparent with further reference to the drawings and specification which follow.

DETAILED DESCRIPTION OF THE INVENTION

A first embodiment of the present invention discloses a diagnostic system for testing computer components (devices) coupled to a computer system. The diagnostic system serves as an agent working with the device drivers of the operating system to test the devices. Since device drivers usually manage access to a device, the diagnostic system facilitates communication between the device driver and a diagnostic module to test the device.

In one embodiment, the diagnostic system includes a diagnostic hardware access layer interface (DHALI). In a further embodiment, the DHALI environment allows a device driver to publish its capabilities to interested diagnostic tests and user interface applications. These capabilities are recognized by a diagnostic module that supports either the device to be tested or its device driver. The diagnostic test then uses DHALI either to bypass the device driver or to work with the device driver to get the device tested.

Figure 1A:
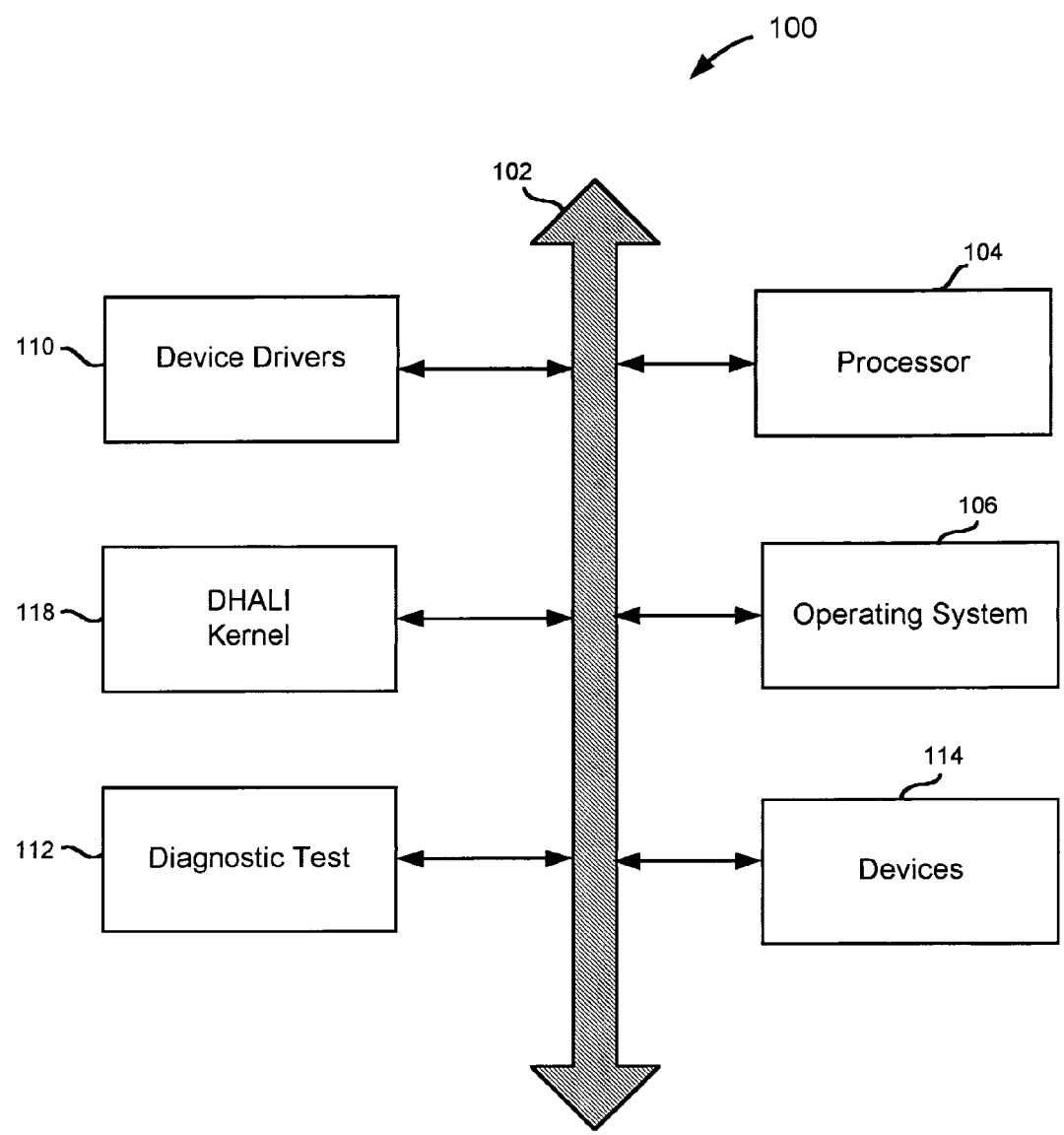
FIG. 1A is an exemplary block diagram of a computer system for testing devices in accordance with a first embodiment of the present invention.

FIG. 1A is an exemplary block diagram of a computer system 100 for testing devices in accordance with a first embodiment of the present invention.

In FIG. 1A, computer system 100 comprises a processor 104 for controlling operations within the computer system 100 in conjunction with an operating system 106, a bus 102 for forwarding signals between system components, a plurality of device drivers 110 for coordinating the flow of data to and from a plurality of devices 114, a DHALI (Diagnostics Hardware Access Layer Interface) kernel 118 working as a registering and synchronizing agent for operating system 106, a diagnostic test 112 for performing diagnostic tests on devices 114. A DHALI environment (not shown) may include DHALI kernel 118, device drivers 110, diagnostic test 112 that communicates with both DHALI kernel 118 and device drivers 110 to perform low-level hardware component tests. As used herein, DHALI kernel 118 is a software component that is added to the operating system. It can be called by both device drivers and diagnostic tests to communicate the capabilities of the device drivers to the diagnostic tests, and to pass instructions from the diagnostic tests to the device drivers. This communication is typically operating system dependent, and occurs with system calls and message notifications.

In operation, a user wishing to test one or more devices 114 begins by installing DHALI kernel 118. Thereafter, DHALI kernel 118 may be initiated either via user interface (not shown) or when the computer system 100 is booted up. Diagnostic test 112 interacts with DHALI kernel 118 by first determining the class of device driver 110 that manages the given device 114 to be tested. Generally, in one embodiment of the present invention, device drivers 110 may be classified based on either the mode of the device driver 110 or the underlying hardware components, or on a combination of both. For purposes of DHALI, device driver 110 may have two or more modes, namely, (1) normal, and (2) off-line. One of ordinary skill in the art will realize that other modes consistent with the spirit and scope of the present invention may be possible. For example, a third mode, namely a diagnostic mode, may be available.

As noted, a number of classifications are available based on the device driver mode and/or features of the hardware components. The classifications are as follows: (1) hardware components accessed in parallel with device driver while ignoring the device driver, (2) hardware components accessed in parallel with device driver after allocating an area of the component using the device driver, (3) hardware components accessed in parallel with the device driver, assuming that the device driver is notified when testing is completed, (4) hardware components accessed in parallel with the device driver when off-line, (5) hardware components accessed through the device driver (pass-through), (6) hardware components accessed through the device driver (pass-through) when in diagnostic mode, and (7) hardware components tested only by diagnostic tests embedded in the device driver (device driver embedded diagnostics). One of ordinary skill in the art will realize that other classifications within the spirit and scope of the present invention are possible. For example, a further classification may relate to hardware components that cannot be tested at all within the DHALI framework.

Upon identifying the class of device driver 110 managing device 114 to be tested, this information is either hard-coded into diagnostic test 112 (if the target device driver and hardware component are previously known), or it can be obtained at runtime through using DHALI, as above. Thereafter, diagnostic test 112 accesses device 114 to perform testing using the DHALI-accepted method for the device driver class. The DHALI-accepted method for various device driver classes are discussed with reference to FIGS. 2A–2G.

Figure 1B:
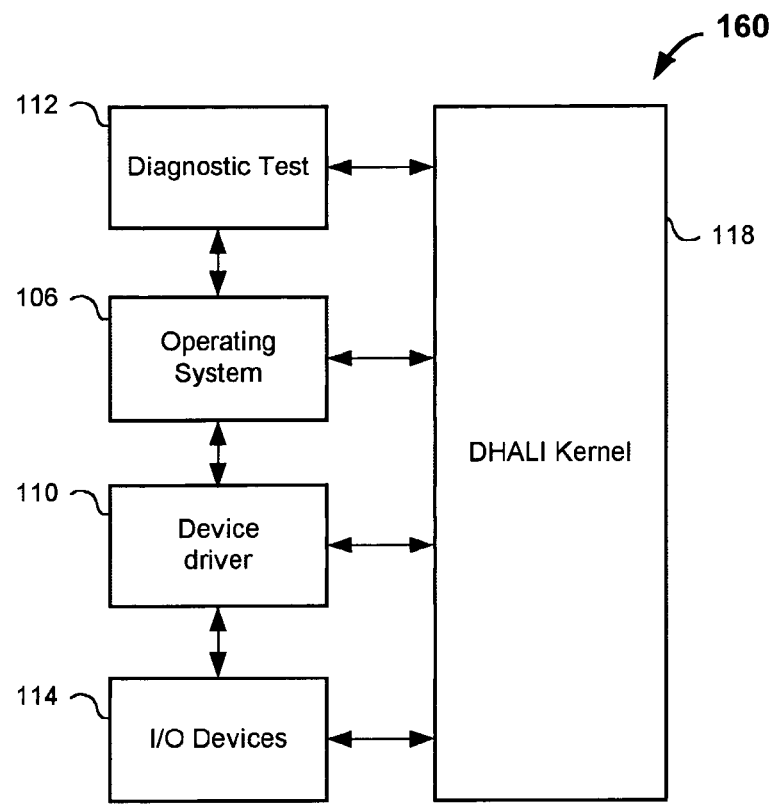
FIG. 1B is an exemplary diagram of a DHALI (diagnostic hardware access layer interface) environment showing the relationship between the components of FIG. 1A in accordance with an alternate embodiment of the present invention.

FIG. 1B is an exemplary diagram of a DHALI environment 160 showing the relationship between the components of FIG. 1A in accordance with a first embodiment of the present invention.

In FIG. 1B, DHALI kernel 118 may communicate in a bi-directional fashion with diagnostic test 112, operating system 106, device driver 110 and devices 114. Similarly, a two-way communication exists between each of the following pairs of components: (1) diagnostic test 112 and operating system 106, (2) operating system 106 and device drivers 110, and (3) device drivers 110 and devices 114.

Figure 2A:
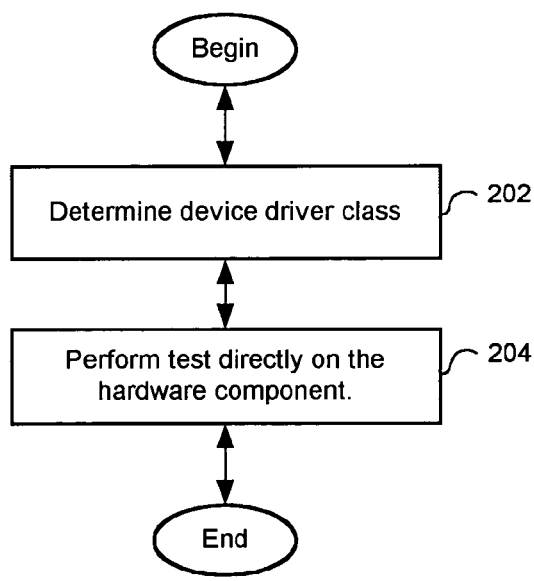
FIG. 2A is an exemplary flow chart illustrating a method for testing a device according to a first class of device drivers.

FIG. 2A is an exemplary flow chart illustrating a method for testing a device according to a first class of device drivers.

In FIG. 2A, at block 202, the method involves determining the specific class of device driver 110 (FIG. 1A) that manages device 114 to be tested. Specifically, in the present embodiment, it is determined that device driver 110 belongs to a class allowing access to device 114 in parallel with the device driver while ignoring the device driver. The determination is made using a function call to the DHALI kernel 118.

At block 204, after the class of device driver 110 is determined, the step involves directly testing device 114. Generally, for a hardware component that is accessed in parallel with the device driver while ignoring the device driver, the diagnostic test 112 can proceed regardless of the state of the device driver. When testing is concluded, the user is immediately notified, e.g., via a pop up box in a Windows™ environment for example, if device 114 is defective. Thereafter, defective device 114 is removed from service. For instance, where device 114 is a system with two network cards, network access is confined to the functioning network card after a failure of one of the cards. Sometimes, a defective device is left in service and only removed later on, for example a network card that no longer functions at 100 Mbps but still functions at 10 Mbps is left in service until a replacement is available. In other instances, the user is asked to manually replace the defective device or continue with system operations.

Figure 2B:
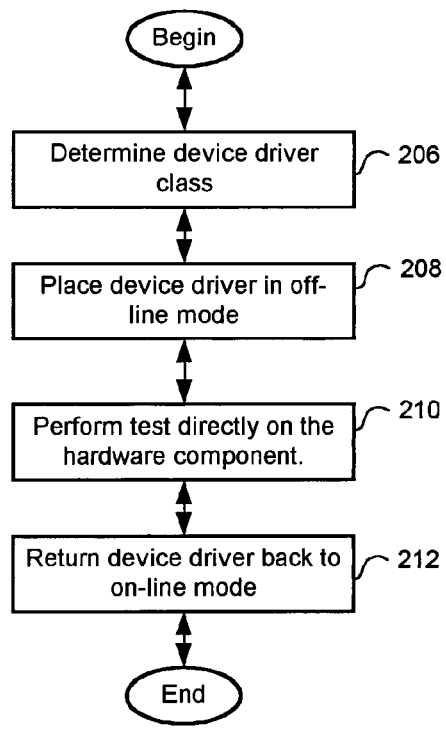
FIG. 2B is an exemplary flow chart illustrating a method for testing a device according to a second class of device drivers.

FIG. 2B is an exemplary flow chart illustrating a method for testing a device according to a second class of device drivers.

In FIG. 2B, at block 206, the method involves determining the specific class of device driver 110 managing device 114 to be tested. Specifically, it is determined that device driver 110 belongs to a class allowing access to the device 114 in parallel with the device driver when off-line. The determination is made using a function call to the DHALI kernel 118.

At block 208, therefore, the step involves placing device driver 110 in an off-line mode. In order to place the device driver 110 in an off-line mode, diagnostic test 112 requests an off-line transition through DHALI kernel 118. If accepted, diagnostic test 112 proceeds with testing of device 114. It is possible that the device is in a state that does not allow transition to off-line mode, in which case the test can not proceed and the user must be notified using a method as discussed with reference to FIG. 2A.

At block 210, after device driver 110 goes off-line, the diagnostic test 112 is performed directly on device 114.

At block 212, testing is concluded and the method specifies returning device driver 110 to an on-line mode. More specifically, when testing is completed, diagnostic test 112 requests DHALI kernel 118 to remove device driver from the off-line mode. If appropriate, the user is notified regarding the defects as discussed with reference to FIG. 2A.

Figure 2C:
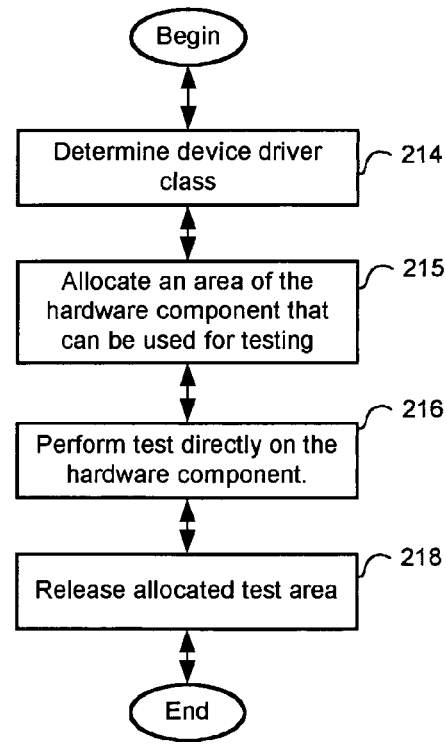
FIG. 2C is an exemplary flow chart illustrating a method for testing a device according to a third class of device drivers.

FIG. 2C is an exemplary flow chart illustrating a method for testing a device according to a third class of device drivers.

In FIG. 2C, at block 214, the method involves determining the specific class of device driver 110 managing device 114 to be tested. In the present embodiment, it is determined that device driver 110 belongs to a class allowing access in parallel with the device driver after allocating an area of the component using the device driver. The determination is made using a function call to the DHALI kernel 118.

At block 215, the method involves allocating an area of the device to be employed for testing. That is, for a hardware component accessed in parallel with the device driver 110 after allocating an area of the component using the device driver 110, the diagnostic test 112 first calls DHALI to allocate an area of the device 114 for testing.

At block 216, the diagnostic test 112 is performed directly on device 114.

At block 218, when testing is concluded, the allocated test area is released.

Figure 2D:
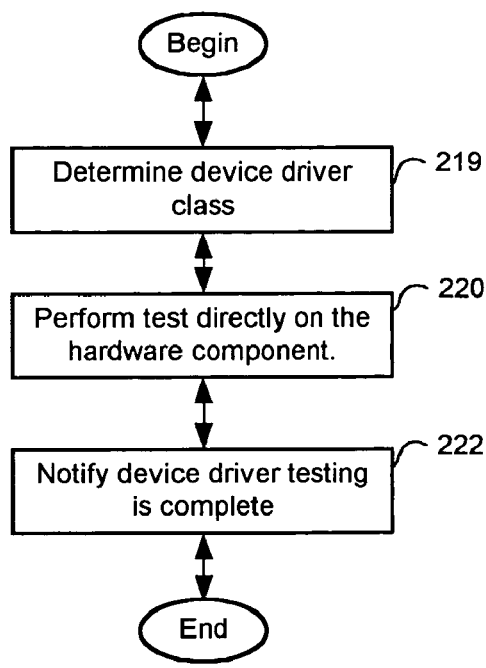
FIG. 2D is an exemplary flow chart illustrating a method for testing a device according to a fourth class of device drivers.

FIG. 2D is an exemplary flow chart illustrating a method for testing a device according to a fourth class of device drivers.

In FIG. 2D, the method involves determining the specific class of device driver 110 controlling the device 114 to be tested at block 219. Device driver 110, according to the present embodiment, belongs to a class allowing access in parallel with the device driver 110 notified by diagnostic test 112 when testing is complete. The determination is made using a function call to the DHALI kernel 118.

At block 220, after device driver 110 is classified, the diagnostic test 112 is performed directly on device 114.

At block 222, once the test is completed, device driver 110 is notified. Generally, for a hardware component that is accessed in parallel with the device driver when testing is completed, the diagnostic test 112 proceeds. At the end of testing, the diagnostic test 112 notifies DHALI that testing is complete.

Figure 2E:
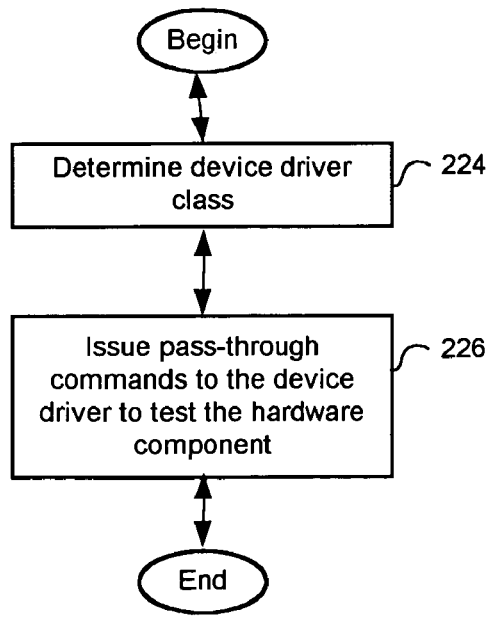
FIG. 2E is an exemplary flow chart illustrating a method for testing a device according to a fifth class of device drivers.

FIG. 2E is an exemplary flow chart illustrating a method for testing a device according to a fifth class of device drivers.

In FIG. 2E, at block 224, the method involves determining the specific class of device driver 110 managing device 114. It is determined that device driver 110 belongs to a class allowing access through (pass through) device driver 110. Pass-through testing makes it possible for diagnostic test 112 to leave detailed knowledge of the underlying hardware up to the device driver 110, instead of performing only higher level function calls. Further, pass-through permits diagnostic test 112 to provide a standard method to issue commands to standard underlying bus environments, such as I2C™, ATA™, SCSI™, Fibre Channel™, etc. The determination is made using a function call to the DHALI kernel 118.

At block 226, since device driver 110 is a pass-through driver, the step involves issuing pass through commands to the device driver 110 to test device 114. In response, device driver 110 allows pass through such that device 114 is tested. These commands may be placed through DHALI kernel 118, as appropriate.

Figure 2F:
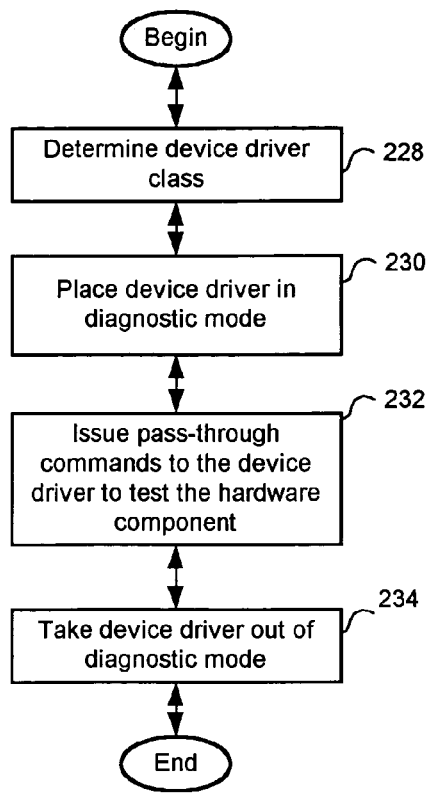
FIG. 2F is an exemplary flow chart illustrating a method for testing a device according to a sixth class of device drivers.

FIG. 2F is an exemplary flow chart illustrating a method for testing a device according to a sixth class of device drivers.

In FIG. 2F, at block 228, the method involves determining the specific class of device driver 110 managing device 114 to be tested. Device driver 110, in the present embodiment, belongs to a class allowing access through (pass through) the device driver 110 when in diagnostic mode. The determination is made using a function call to the DHALI kernel 118.

Correspondingly, at block 230, device driver 110 is placed in diagnostic mode. This occurs by requesting a diagnostic-mode transition through DHALI kernel 118.

At block 232, the method involves issuing pass-through commands to device driver 110 to test device 114. In the diagnostic mode, a device driver 110 will respond to several special diagnostic mode commands that facilitate the DHALI process, namely, (1) report DHALI features, (2) enter or exit diagnostic mode, (3) reinitialize device, (4) give pass through commands, (5) perform diagnostic test, (6) report diagnostic test status.

At block 234, device driver 110 is taken out of the diagnostic mode when testing is completed. Device driver 110 may be returned to either the off-line or on-line mode as appropriate or as specified by DHALI kernel 118.

Figure 2G:
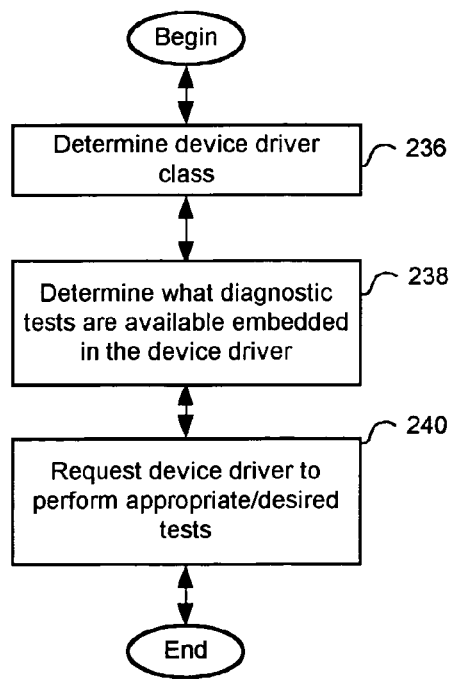
FIG. 2G is an exemplary flow chart illustrating a method for testing a device according to a seventh class of device drivers.

FIG. 2G is an exemplary flow chart illustrating a method for testing a device according to a seventh class of device drivers.

In FIG. 2G, at block 236, the method involves determining the specific class of device driver 110 managing device 114 to be tested. In the present embodiment, it is determined that device driver 110 belongs to a class allowing testing by diagnostic tests embedded in device driver 110 (device driver embedded diagnostics). That is, diagnostic test 112 is embedded in device driver 110 or in a kernel-mode application, in order to have better control over the underlying hardware component during the testing process. The determination is made using a function call to the DHALI kernel 118.

At block 238, the available diagnostic tests embedded in device driver 110 are determined. DHALI kernel 118 allows application programs to determine the available device-driver-level diagnostic tests and their properties, including (1) test name; (2) test description; (3) estimated test duration; (4) description of impact on the normal operations of the device during the test that might include (a) device will be off-line during test but will queue requests for later execution, (b) device is off-line during testing and will ignore any requests made to it during the test, and (c) device access for other uses is very slow during the test; (5) indication that the test requires an external test fixture to be attached to the system; (6) availability of the test in the current configuration; (7) current status (a) not testing, (b) testing active and how far progressed; and (8) time of last test and results of that test. One of ordinary skill in the art will realize that other properties and impact of diagnostic test 112 are possible.

At block 240, device driver is requested to perform the available/desired tests. Thereafter, the embedded tests are started using DHALI kernel 118, and upon conclusion of the tests, a test report and the ensuing results are reported using DHALI kernel 118. Thus, for a hardware component tested using only diagnostic tests embedded in the device driver 110 (device driver embedded diagnostics), diagnostic test 112 uses DHALI kernel 118 to enumerate tests available in the device driver 110, and to initiate them using DHALI.

Although not shown, one of ordinary skill in the art will realize that a device driver 110 may support multiple classes, provided the underlying hardware components allow multiple classifications, in which case the diagnostic test 112 decides the test which uses one or more classifications. Moreover, some of the methods may require knowledge of the hardware components, with the diagnostic test 112 writing directly to registers of the hardware components.

Therefore, while the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A method for performing diagnostics on a computer hardware device having a device driver for interfacing with the computer hardware device, the method comprising:
   publishing capabilities of the device driver;
   receiving the capabilities of the device driver;
   determining, from the capabilities of the device driver, information about how the computer hardware device interacts with a computer system and how the computer hardware device can be accessed; and
   performing a diagnostic test on the computer hardware device, based on the information about how the computer hardware device interacts with a computer system and how the computer hardware device can be accessed, wherein the step of publishing capabilities of the device driver further comprises broadcasting that the device driver is capable of accessing the computer hardware device in parallel with a diagnostic module after allocating an area of the computer hardware device for testing.

2. The method of claim 1 wherein the step of receiving capabilities of the device driver further comprises identifying capabilities of the device driver by a diagnostic module.

3. The method of claim 2 wherein the step of performing a diagnostic test further comprises testing the computer hardware device using the diagnostic module.

4. The method of claim 1 further comprising coordinating access to the computer hardware device prior to the step of performing a diagnostic test.

5. The method of claim 1 further comprising determining the device driver is for interfacing with the computer hardware device.

6. The method of claim 1 further comprising allocating an area of the input/output device for testing the device.

7. The method of claim 6 wherein the step of performing a diagnostic test is done directly on the area allocated, and further comprises the step of releasing the area allocated when the test is concluded.

8. A method for performing diagnostics on a computer hardware device having a device driver for interfacing with the computer hardware device, the method comprising:
publishing capabilities of the device driver;
receiving the capabilities of the device driver;
determining, from the capabilities of the device driver, information about how the computer hardware device interacts with a computer system and how the computer hardware device can be accessed; and
performing a diagnostic test on the computer hardware device, based on the information about how the computer hardware device interacts with a computer system and how the computer hardware device can be accessed, wherein the step of publishing capabilities of the device driver further comprises broadcasting that the device driver is capable of accessing the computer hardware device in parallel with a diagnostic module if the device driver is notified by the diagnostic module when testing is complete.

9. The method of claim 8 wherein the step of receiving capabilities of the device driver further comprises identifying capabilities of the device driver by a diagnostic module.

10. The method of claim 9 wherein the step of performing a diagnostic test further comprises testing the computer hardware device using the diagnostic module.

11. The method of claim 8 further comprising coordinating access to the computer hardware device prior to the step of performing a diagnostic test.

12. The method of claim 8 further comprising determining the device driver is for interfacing with the computer hardware device.

13. The method of claim 8 further comprising allocating an area of the input/output device for testing the device.

14. The method of claim 13 wherein the step of performing a diagnostic test is done directly on the area allocated, and further comprises the step of releasing the area allocated when the test is concluded.

15. A method for performing diagnostics on a computer hardware device having a device driver for interfacing with the computer hardware device, the method comprising:
publishing capabilities of the device driver;
receiving the capabilities of the device driver;
determining, from the capabilities of the device driver, information about how the computer hardware device interacts with a computer system and how the computer hardware device can be accessed; and
performing a diagnostic test on the computer hardware device, based on the information about how the computer hardware device interacts with a computer system and how the computer hardware device can be accessed, wherein the step of publishing capabilities of the device driver further comprises broadcasting that the device driver is capable of accessing the computer hardware device in parallel with a diagnostic module if the device driver is off-line.

16. The method of claim 15 wherein the step of receiving capabilities of the device driver further comprises identifying capabilities of the device driver by a diagnostic module.

17. The method of claim 16 wherein the step of performing a diagnostic test further comprises testing the computer hardware device using the diagnostic module.

18. The method of claim 15 further comprising coordinating access to the computer hardware device prior to the step of performing a diagnostic test.

19. The method of claim 15 further comprising determining the device driver is for interfacing with the computer hardware device.

20. The method of claim 15 further comprising allocating an area of the input/output device for testing the device.

21. The method of claim 20 wherein the step of performing a diagnostic test is done directly on the area allocated, and further comprises the step of releasing the area allocated when the test is concluded.

22. A method for performing diagnostics on a computer hardware device having a device driver for interfacing with the computer hardware device, the method comprising:
publishing capabilities of the device driver;
receiving the capabilities of the device driver;
determining, from the capabilities of the device driver, information about how the computer hardware device interacts with a computer system and how the computer hardware device can be accessed; and
performing a diagnostic test on the computer hardware device, based on the information about how the computer hardware device interacts with a computer system and how the computer hardware device can be accessed, wherein the step of publishing capabilities of the device driver further comprises broadcasting that the device driver is capable of being passed through when in diagnostic mode to access the computer hardware device.

23. The method of claim 22 wherein the step of receiving capabilities of the device driver further comprises identifying capabilities of the device driver by a diagnostic module.

24. The method of claim 23 wherein the step of performing a diagnostic test further comprises testing the computer hardware device using the diagnostic module.

25. The method of claim 22 further comprising coordinating access to the computer hardware device prior to the step of performing a diagnostic test.

26. The method of claim 22 further comprising determining the device driver is for interfacing with the computer hardware device.

27. The method of claim 22 further comprising allocating an area of the input/output device for testing the device.

28. The method of claim 27 wherein the step of performing a diagnostic test is done directly on the area allocated, and further comprises the step of releasing the area allocated when the test is concluded.

* * * * *